United States Patent Office

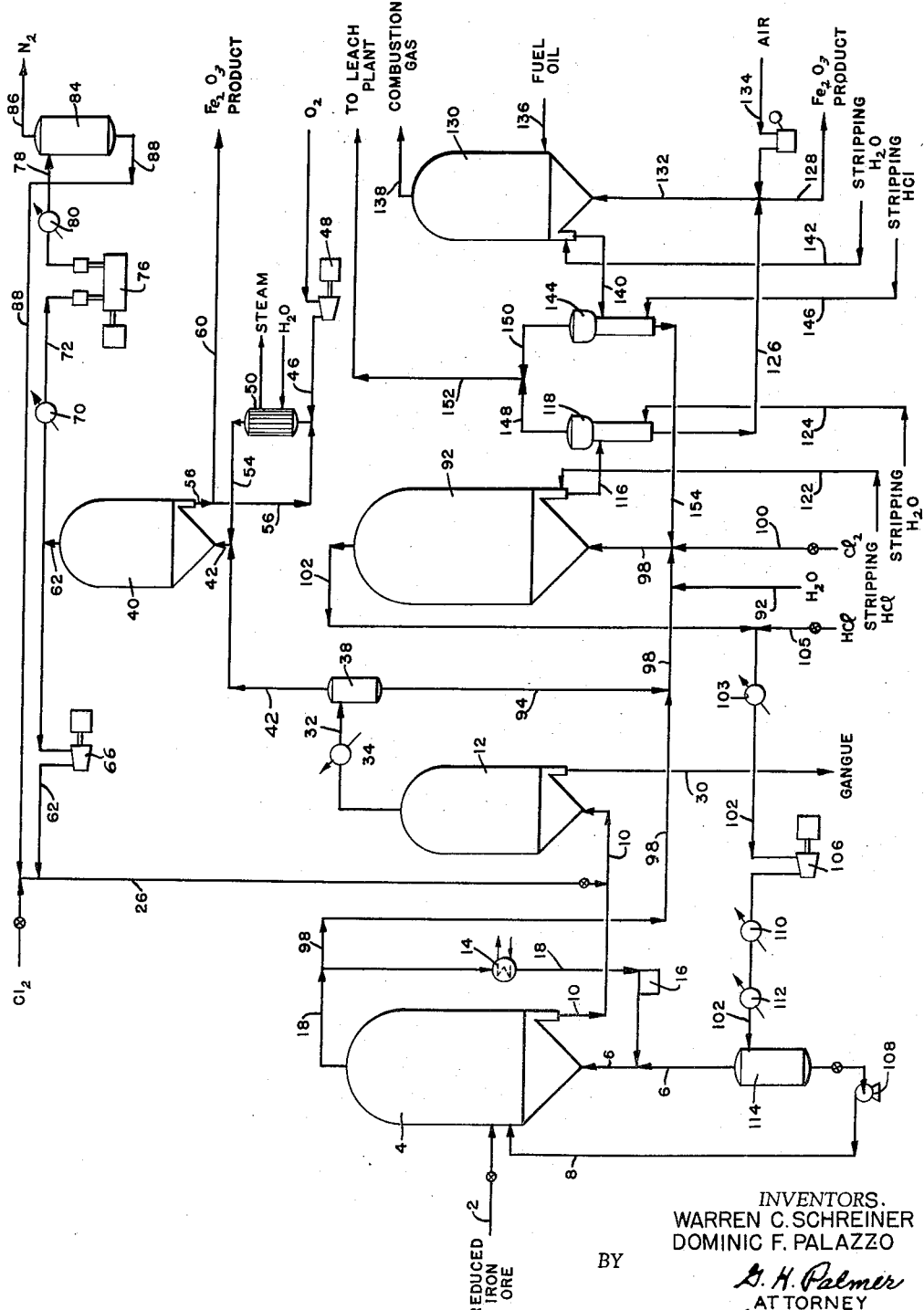

2,993,759
Patented July 25, 1961

2,993,759
TREATMENT OF IRON ORE
Warren C. Schreiner, East Norwich, and Dominic F. Palazzo, Brooklyn, N.Y., assignors to The M. W. Kellogg Company, Jersey City, N.J., a corporation of Delaware
Filed Sept. 15, 1958, Ser. No. 760,896
14 Claims. (Cl. 23—200)

This invention relates to a process for treating iron ore. In one aspect this invention relates to a process for separating iron from other constituents. In another aspect this invention relates to the production of ferric oxide in high yield and in a high state of purity. Another aspect of this invention relates to the production of metal chlorides. Still another aspect relates to the concentration of iron values in an ore containing iron oxide.

The art of beneficiating iron ores containing iron oxide has assumed great importance in recent years due to the ever increasing demand for this material and to the gradual depletion of our domestic ore deposits. Until recently, only ores containing a high percentage of iron, such as magnetite and haematite, were used in the production of pig iron because these ores were available in large quantities and because the iron contained in them can be recovered by inexpensive processing methods such as the blast furance reduction of iron ore. While the blast furnace treatment is suitable for processing high grade ores, it is completely inadequate for the removal of iron from low grade ores, i.e., taconite ores. In commercial processing it is necessary to subject low grade ores of this type to beneficiation or concentration prior to the blast furnace operation, and, as the demand for pig iron increases and the higher grade ore deposits are depleted, beneficiation of the lower grade ores becomes an important commercial problem.

Of the beneficiation processes currently in use, such as magnetic separation of iron from finely ground ore, jigging, tabling, flotation, etc., none possess the desired efficiency of operation in commercial processes. Therefore, the need for a process capable of concentrating iron values in a low grade ore without excessive iron losses, has long been felt in the industry.

Another problem in the production of pig iron which faces the industry today concerns high grade ore. Analysis of various ores show some having a high iron content are also rich or contain small amounts of cobalt, nickel, chromium, and/or other valuable metals which are present is "impurities" when they are removed in the iron product of a blast furnace. Although it is desirable to recover these valuable metals from the ore, they should not be allowed to admix with the pig iron. When the iron product is to be used in the production of structural steel, very small quantities of these metals can lower the strength characteristics of the steel to such an extent that it becomes unfit for use. On the other hand, when it is desirable to produce corrosion-resistant steels, small amounts of these metals are alloyed with iron. However, these metals are carefully added to the iron in exact proportions and not in uncontrolled amounts as when these metals are produced as "impurities" in pig iron. Therefore, a great demand exists for an economical, commercial process wherein iron and other valuable metals can be separately recovered in order to provide iron suitable for the uses discussed above and valuable metals suitable for metal plating, alloying, etc.

Accordingly, special methods of iron ore beneficiation are being considered and developed. Previous investigators have proposed treating metallic ores containing ferric oxide with hydrogen chloride to convert the iron oxide to ferric chloride. It also has been proposed that this reaction be carried out using a temperature of about 100° C. so that the iron chloride and water formed in this stage could be later reacted at a suitable temperature to produce iron oxide in a reasonably pure state. However, one of the many difficulties encountered in this method of beneficiation, namely, that of water condensation and the subsequent formation of a slurry containing non-ferrous metal chlorides as well as iron oxide, prevents this process from having commercial application. Another undesirable characteristic of this process is the incomplete conversion of the iron oxide to iron chloride and this disadvantage results in low yields of pure iron oxide.

It has also been suggested that water be removed from the reaction zone upon formation of the ferric chloride in order to prevent immediate reversal of this reaction and the slurry forming condensation. In this proposed process, solid ferric chloride is formed and subsequently separated from the gangue by leaching with small amounts of water. The separated ferric chloride is then treated in a separate chamber with air to effect oxidation to ferric oxide. Attempts to utilize this process have proven to be commercially inadequate since the yield of ferric oxide with respect to the iron oxide in the ore processed is low. The poor yield has been attributed to the incomplete separation of ferric chloride by the leaching operation, with the result that much of the ferric chloride produced is lost in the gangue.

Another method developed in an attempt to circumvent the formation of slurries and the incomplete separation of ferric chloride from the gangue, involves the treatment of ore with chlorine gas in the presence of carbon at 500° C., thereby forming a vaporized product which can be removed as a gas. This method has also been found lacking because of the simultaneous formation of the undesirable chlorides of silicon, aluminum, phosphorous, etc., thereby necessitating the separation of gaseous components which is extremely difficult, not to mention the cost of carbon addition to the system.

It is, therefore, an object of this invention to provide a new and improved method for treating iron-containing materials.

Another object of this invention is to provide an economically feasible and commercial method of beneficiating an iron oxide containing ore.

Another object of this invention is to provide a method for processing iron ore which results in the production of pure ferric oxide in high yield.

Another object of this invention is to provide for the substantially complete recovery of iron in the form of ferric oxide from an iron ore containing a major or a minor proportion of other material.

Another object of this invention is to provide a method for processing iron ore which results in the separate recovery of iron oxide and of other valuable metals.

Another object of this invention is to provide a continuous and improved method for recovering ferric oxide from an ore.

Still another object of this invention is to provide a method for producing ferric chloride in a pure state.

Other objects and advantages of the present invention will become apparent to those skilled in the art from the accompanying description and disclosure.

According to the process of this invention, iron ore is treated under reducing conditions until substantially all of the iron oxide present in the ore is converted to the ferrous state as ferrous oxide (FeO). The iron oxide is then subjected to a two-step chlorination, first with hydrogen chloride and then with chlorine gas under conditions such that ferric chloride vapor is formed. The chlorination may be followed by oxidation in which case, the vaporous ferric chloride is removed from the chlorination zone and oxidized to ferric oxide by heating the vapor with an oxidizing agent. A preferred method for carrying out the oxidation comprises dividing the ferric oxide vapors into two streams and transferring each stream to a separate treating zone. One stream is hydrolyzed with water while the other is contacted with oxygen or its equivalent (ozone or air). Both reactions result in the production of solid ferric oxide in high yield and in a high state of purity while the gases generated from the oxidation and the hydrolysis zones, namely, chlorine and hydrogen chloride, are obtained in sufficiently high concentration to warrant their being recycled directly to their respective chlorinating zones as reactant gases. Other valuable metals such as cobalt and nickel, can be removed from the ore as chlorides after the removal of ferric chloride vapor, if so desired.

The above process can be employed in the treatment of any of the numerous types of iron ore containing iron oxide. Among the better known types of ore specifically referred to are: limonite, haematite, goethite, magnetite, ilmenite, and martite. These ores are known for their high iron content, however, it should be understood that low grade ores requiring iron concentration such as, for example, American taconite, etc., are equally well adapted to treatment by the present process.

The process herein described is particularly suited for the treatment of Cuban ore which, when in an anhydrous state, contains 50 percent to 60 percent metallic iron present as ferric oxide, between about 0.5 percent and about 5 percent of chromium as chromic oxide and aluminum oxide with traces of sulfur and phosphorus. Ores of this type are Mayari ore, Nicaro ore, Conakry ore, etc. Ores similar to Cuban ore and which are equally well adapted for treatment by the present process include ores found in Greece and New Caledonia.

Previous processes teach the direct chlorination of ore containing ferric oxide or mixtures of ferric and ferrous oxides. However, it has been unexpectedly discovered that this procedure does not provide the best conversion to ferric chloride and, therefore, previous processes have been low in efficiency. Surprisingly, it has been discovered that extremely high conversions of iron oxide to ferric chloride are obtained when substantially all of the ferric oxide in the ore is reduced to ferrous oxide before chlorination. It appears that a more favorable equilibrium for the chlorination reaction is thus provided making higher conversions possible. Accordingly, when operating within the scope of the present invention the ore is introduced into a heating vessel, such as, a rotary kiln, a ball mill furnace or a stationary oven where the ore is admixed with a reducing gas and heated until substantially all of the iron oxide is converted to ferrous oxide. The process may employ a fixed bed, a moving bed or a fluidized bed of iron ore. The ore may be introduced into the heating vessel as lumps or as finely divided material, however, it is particularly preferred that the ore particles be in sizes of between about 3 microns for a fluidized bed process to about 2 inches in diameter for a fixed bed process. Although some conversion of the ferric oxide to ferrous oxide takes place almost immediately, the reduction operation may require several days to complete, depending on the reaction conditions, particularly the temperature and pressure. Reducing gases which can be used to effect reduction of the ore are methane, carbon monoxide, hydrogen, producer gas, coke or mixtures of hydrogen and carbon monoxide; the preferred reducing gas being either producer gas or coke oven gas. The reduction generally takes place at a temperature of between about 800° F. and about 2300° F., preferably at a temperature of between about 1000° F. and about 2000° F. Although the above described reduction process has been found useful in preparing iron ore for a subsequent treatment, it is to be understood that any other convenient method for converting ferric oxide to ferrous oxide may be used without departing from the scope of this invention.

After reducing the iron oxide in the ore to ferrous oxide, the reduced material is chlorinated in a chlorination zone. The best results are obtained when the ore is chlorinated immediately following reduction, however, there is no limit on the holding time of the reduced ore provided that reasonable precautions for keeping the ore dry are observed. Should these precautions be overlooked, it is possible to restore the ore to a dry state merely by heating it at a temperature not higher than 1400° F. for one or more hours prior to chlorination.

An important advantage of the present process is realized by carrying out the chlorination reaction in two steps. The first step comprises contacting the reduced ore with hydrogen chloride to effect the conversion of ferrous oxide to ferrous chloride; the second step comprises contacting ferrous chloride with chlorine to effect the conversion of ferrous chloride to ferric chloride. In this way, it is possible to attain substantially complete conversion of the iron oxide in the ore to ferric chloride and to eliminate unnecessary recompression and recycling of unconverted gases. Another advantage realized by the two-step operation is that the chlorination reaction is not limited to the equilibrium for ferric oxide to ferric chloride gas, as is the case when converting ferric oxide directly to ferric chloride with a mixture of hydrogen chloride and chlorine gases or either of these gases alone. The present method, therefore, provides for the improved utilization of the separate chlorinating agents employed and an economic advantage which follows is that the greater part of the chlorination reaction is accomplished with the cheaper of the two chlorinating agents, namely, hydrogen chloride. Therefore, the two-step chlorination in two separate chlorination zones, as an essential feature of the present invention, has great commercial significance.

According to the present process, reduced iron ore is chlorinated in a first chlorinating zone with hydrogen chloride in 35 percent to 100 percent concentration. The diluent, if one is employed, is preferably water although any inert gas such as nitrogen may be used, if desired. The conditions recommended for the chlorination reaction include a temperature of between about 500° F. and about 1400° F., preferably between about 700° F. and about 950° F. and a pressure between about 20 p.s.i.a. and about 200 p.s.i.a., preferably from about 30 p.s.i.a. to about 50 p.s.i.a. The mole ratio of hydrogen chloride to ferrous oxide fed to this first chlorination zone varies between about 50:1 and about 2:1. However, for economy of operation, mole ratios of between about 10:1 and about 2:1 are preferred. The upper limit of hydrogen chloride is dictated by practical considerations and it is not to be understood that larger amounts of hydrogen chloride cannot be used or that such ratios as, for example 100:1 are outside the scope of this invention. Although some ferrous chloride is formed in a few minutes, this step of the present process may require a residence time up to 15 hours to complete; however, a period of from about 2 to about 6 hours is usually considered sufficient to provide complete conversion of the ferrous oxide to solid ferrous chloride. Some cobalt, nickel, chromium, etc., which also may be present in the ore, is converted to the corresponding chlorides in this stage of the process.

The steam, which is produced as a by-product of the first chlorination step, is removed as rapidly as it is formed and is used in a later stage of the process, namely, the hydrolysis stage hereinafter described.

After completion of the primary chlorinating step, the solid materials, namely, ferrous chloride, other metal chlorides and gangue are transferred to a second chlorination zone where they are contacted with chlorine gas at a temperature of between about 600° F. and about 1200° F., preferably at a temperature of between about 650° F. and about 750° F., under a pressure of from about 10 p.s.i.a. to about 60 p.s.i.a., preferably from about 30 p.s.i.a. to about 50 p.s.i.a. The ferrous chloride is thus converted to ferric chloride together with additional quantities of other metal chlorides which may be present in the ores such as cobalt, nickel, chromium, etc. The temperature and pressure requirements for this secondary chlorination are such that only ferric chloride is vaporized and the other chlorides remain as solids with the gangue, the ferric chloride vapor being continuously removed as it is formed from the chlorination zone. The mole ratio of chlorine gas to ferrous chloride which is employed in this step of the chlorination operation is between about 0.5:1 and about 10:1, preferably between about 0.5:1 and about 2:1. Here, as above, the upper limit of the chlorine gas is given as an economic measure and larger amounts may be employed, if desired. The residence time in the second chlorination zone is generally not more than five hours.

The second chlorination zone may be located in the same reactor as the first chlorination zone but the reactants between the zones should be prevented from mixing or the advantage of the present process is lost. In the preferred method of operation, however, it has been found more convenient to employ two separate chlorinating units. For most efficient operation and for ease of product removal, it is desirable to elevate the first chlorination zone above the second chlorination zone in order to provide gravitational transfer of the solid chlorinated material together with the gangue from the first chlorinating zone to the second chlorinating zone.

Upon completion of the second chlorination step, the gangue material, together with non-ferric metal chlorides, is removed and is either discharged or further treated to remove valuable metal chlorides which may be present therein.

For example, the gangue may be processed with a leach of $HCl$—$H_2O$ to solubilize chromium, cobalt and/or nickel. The solubilized material is then concentrated and removed by precipitation or by any other convenient method or process.

The ferric chloride vapor which has been removed from the second chlorination zone may be considered the product of the process, if desired, and may be used in the vaporous state or may be condensed and employed as a catalyst in Ziegler-type reactions, as a catalyst in other known commercial processes or as a reactant for any other convenient use.

In the process of the present application, it is also possible to recover iron in the metallic state or in the form of ferric oxide. When metallic iron is the desired product of the process, the ferric chloride vapor is treated with hydrogen gas in a mole ratio of between about 1.5:1 and about 20:1, preferably between about 1.5:1 and about 7:1 ($H_2$:$FeCl_3$) at a temperature of between about 400° F. and about 1800° F., preferably between about 625° F. and about 1500° F., under a pressure of from about atmospheric to about 500 p.s.i.a., preferably from about atmospheric to about 400 p.s.i.a. The product is cooled and metallic iron is withdrawn from the reaction chamber. The hydrogen chloride gas produced by the ferric chloride-hydrogen reaction can be removed from the reaction zone and a portion treated with oxygen to produce chlorine. The chlorine and the hydrogen chloride gases are then recycled to their respective chlorinating zones.

When iron oxide is desired as a product of the process, the preferred method of the present invention involves splitting the vaporous ferric chloride into two streams and passing each stream to a separate zone where they are heated and reacted to produce ferric oxide. One stream is heated with steam at a temperature of between about 600° F. and about 1400° F., preferably between about 950° F. and about 1050° F., under from about 12 p.s.i.a. to about 200 p.s.i.a., preferably from about 15 p.s.i.a. to about 25 p.s.i.a., while the other stream is heated with oxygen, or its equivalent, at a temperature of between about 400° F. and about 1000° F., preferably between about 600° F. and about 700° F., under from about 20 p.s.i.a. to about 200 p.s.i.a., preferably from about 25 p.s.i.a. to about 35 p.s.i.a. Solid ferric oxide is deposited in both zones and the gases generated in each zone, namely, gaseous hydrogen chloride from the hydrolysis of ferric chloride with water, and chlorine from the oxidation of ferric chloride with oxygen, are removed from their respective zones, recompressed and recycled each to its respective chlorinating zone. The use of two separate treating zones for the conversion of ferric chloride to ferric oxide is essential in the present process for, if a single zone were employed, it would not be possible to directly regenerate both of the chlorinating agents and to directly recycle them to their respective chlorination zones.

The mole ratio of water to ferric chloride in the feed to the first oxidation zone is between about .75:1 and about 10:1, preferably between about .75:1 and about 3:1. Although water from the tap can be pressurized, heated and added directly to the oxidation zone, it is preferred to employ the steam generated and removed from the first chlorination zone since the use of this material avoids unnecessary heating and pressurizing. The mole ratio of oxygen, or its equivalent, to ferric chloride in the feed in the second oxidation zone is between about 0.375:1 and about 5:1, preferably between about 0.375:1 and about 2:1. The upper ratio limits of water and oxygen are not critical, but for economic considerations it has been found desirable to operate within the above ranges. The residence time of the ferric chloride in the oxidation zone or the hydrolysis zone usually does not exceed 24 hours.

It can be seen that the present process, although suited to batch operation, is readily adapted to a continuous, self-regenerating operation by dividing the ferric chloride stream into such portions that the proper proportions of chlorinating gases will be regenerated. For example, it is recommended that ⅔ of the ferric chloride be treated with steam and the remaining portion of ferric chloride be treated with oxygen. The temperature employed throughout the process, both in the chlorinating and oxidizing stages, may be increased when corrosion to the apparatus is not a considerable factor or when the apparatus is so constructed that corrosion is avoided as, for example, in a chlorinator provided with a ceramic liner. The temperature and pressure, however, must be controlled so that the reaction proceeds in the prescribed manner, that is, only the ferric chloride formed in the second chlorination step must be vaporized and the ferric oxide formed in the oxidation reaction must be deposited as a solid to insure complete conversion of the ferric chloride to ferric oxide and for ease of separating the gaseous materials therefrom.

Alternate methods for producing ferric oxide include reacting substantially all of the ferric chloride with oxygen to produce ferric oxide and chlorine and thereafter removing the chlorine gas and recycling a portion, preferably about 33 percent to the second stage chlorination while reacting the remaining portion of chlorine with hydrogen to form hydrogen chloride which is then recycled. Still another method for producing ferric oxide includes the reaction of substantially all of the ferric chloride with steam at a temperature between about 600° F. and about 1400° F., under a pressure from about 12 p.s.i.a. to about 200 p.s.i.a. The hydrogen chloride gas produced in this reaction is removed from the reaction zone and a portion, preferably about ⅔, is returned to the first stage chlorination, while the remaining portion is reacted with oxygen to produce chlorine. The chlorine gas thus produced is recycled to the second stage chlorination zone.

Should it be desired to obtain both metallic iron and ferric oxide as a product of the present process, it is possible to react a portion of the ferric chloride with hydrogen in a first treating zone to produce metallic iron and hydrogen chloride and to react another portion of ferric chloride with oxygen in a second treating zone to form ferric oxide and chlorine. Here again, it is most desirable to subject ⅔ of the ferric chloride to the first reaction, since by this means the proper proportion of chlorinating gases is produced and the system is self-regenerating. Many other combinations of the above-discussed reactions will be apparent to those skilled in the art and it is intended that these combinations be included within the scope of this invention.

By way of illustrating a preferred embodiment of the present invention, reference is now had to the accompanying drawing wherein the process of removing ferric oxide from iron ore is described in detail. Reduced iron ore is introduced under pressurized flow through feed line 2 into primary chlorinator 4 where it is heated and contacted with pressurized hydrogen chloride entering the primary chlorinator through lines 6 and 8 from a source hereinafter described. The flow of these reactants into chlorinator 4 is so regulated that the quantities present are in accordance with the aforementioned mole ratio requirements. The ferrous chloride which is formed in chlorinator 4 by the reaction between ferrous oxide in the reduced ore and hydrogen chloride, together with other chlorides and gangue, is then transferred by means of line 10 to a secondary chlorinator 12 and the water or steam formed in the primary chlorinator is removed overhead through lines 18 and 98. A portion of the steam containing unreacted hydrogen chloride and a small amount of hydrogen gas is recycled to chlorinator 4 by means of lines 18 and 6 to control the temperature of the exothermic reaction between ferrous oxide and hydrogen chloride. In line 18, the mixture of gases is cooled by indirect heat exchange with water in heat exchanger 14 and the temperature is sufficiently reduced so that conditions in chlorinator 4 are maintained within the aforementioned temperature range. The cooled gas is passed into line 6 by means of blower 16 from which the gas enters the primary chlorinator in admixture with hydrogen chloride also entering chlorinator 4 through line 6. The remaining portion of steam, containing some hydrogen chloride and hydrogen, is passed to take-off line 98, which joins line 18 above heat exchanger 14, and is then passed to hydrolyzer 92 for use in a subsequent step of the present process hereinafter described.

The gangue and ferrous chloride in line 10 is then contacted with chlorine gas, introduced through valved line 26 and the gaseous mixture, in the proper molar proportion, is then passed to chlorinator 12 through line 10. The temperature in the secondary chlorinator is maintained above the vaporization temperature of the ferric chloride formed therein by the reaction of ferrous chloride with chlorine gas, but below the vaporization temperature of other metal chlorides which may be present in the chlorination zone. The gangue and other metal chlorides, together with a small amount of hydrogen chloride, are removed as solids from secondary chlorinator 12 through line 30, while the ferric chloride is continuously removed from chlorinator 12 by means of line 32 and passed through indirect heat exchanger 34 where the ferric chloride is cooled and partially condensed by indirect heat exchange with water. The partially condensed vapors, together with some entrained chlorine gas, is then passed to separator 38 by means of line 32. The vaporized portion of ferric chloride, together with a small amount of entrained chlorine gas, is removed from separator 38 by line 42 and is then passed to oxidizer 40, while the liquid portion of ferric chloride is removed from separator 38 by line 94, and passed into line 98 from which it is transferred to hydrolyzer 92 in admixture with steam.

Oxygen is introduced into oxidizer 40 through line 46, in an amount within the previously described mole ratio after being compressed in compressor 48 to the desired pressure in the aforementioned range. The compressed gas is then passed through heat exchanger 50 where the gas serves to fluidize ferric oxide removed from oxidizer 40, hereinafter described. The fluidized mixture is simultaneously cooled by indirect heat exchange with water in heat exchanger 50. The ferric oxide-oxygen mixture is removed, passed through line 54 and into line 42 from which it enters oxidizer 40 for contact with vaporous ferric chloride. The oxygen gas is totally consumed in the ensuing reaction and the ferric oxide formed in oxidizer 40 by the reaction of ferric chloride with oxygen, together with ferric oxide entering oxidizer 40 in the oxygen feed stream, is removed from oxidizer 40 through line 56. A minor portion of the solid ferric oxide is removed as product through product take-off line 60 and the remaining portion of solid ferric oxide is passed from line 56 into heat exchanger 50 after which the above recycling operation is repeated.

The chlorine gas which is generated in oxidizer 40 as a by-product of the reaction is removed from the oxidation zone by means of line 62 in a concentrated state. A portion of the chlorine gas removed is then passed to compressor 66 where the pressure is increased to that required in chlorinator 12. The compressed gas from line 62 is then passed into line 26 from whence it is recycled to the secondary chlorinator 12 as part of the chlorine feed thereto, together with fresh chlorine feed. Some nitrogen enters the system with the oxygen feed and the concentration of this impurity gradually builds up to a point where it becomes necessary to remove it. Therefore, nitrogen is purged from the remaining portion of the chlorine gas, which is passed from line 62, to cooler 70 and then to compressor 76 by line 72. The gaseous chlorine and entrained nitrogen is removed from compressor 76 by line 78 and condensed in cooler 80. The condensed stream containing nitrogen and a small amount of chlorine is then transferred to separator 84 by means of line 78. The entrained gaseous nitrogen and a small amount of gaseous chlorine are removed from separator 84 and from the system by means of line 86 while the condensate, consisting of chlorine gas, is removed from separator 84 by line 88 and is then passed to line 26 as part of the chlorine feed to secondary chlorinator 12.

The remaining portion of ferric chloride is simultaneously treated with steam from chlorinator 4 in hydrolyzer 92. Fresh chlorine gas is also introduced to hydrolyzer 92 through lines 100 and 98 to react with the hydrogen entrained with the steam thus resulting in the formation of additional hydrogen chloride needed to compensate for the loss of hydrogen chloride removed with the gangue. The reaction which takes place in hydrolyzer 92 between ferric chloride and water results in the production of ferric oxide and hydrogen chloride. The hydrogen chloride is removed from hydrolyzer 92 in a concentrated state and is passed into heat exchanger 106 by line 102 where it is cooled by indirect heat exchange with water. The hydrogen chloride is passed through from line 102 and into compressor 106 where the gas is compressed to the pressure required in chlorinator 4. The compressed gas is transferred to cooler 110 wherein sensible heat is removed from the gas and then to a corrosion resistant condenser 112 wherein the hydrogen chloride is partially condensed. The partially condensed hydrogen chloride is removed from condenser 112 and transferred to separator 114 by line 102 and is then recycled to primary chlorinator 4; the vapor passing through line 6 and the liquid hydrochloric acid being pumped by pump 108 through line 8.

The ferric oxide produced in hydrolyzer 92 is removed therefrom by line 116 and passed to iron oxide stripper 118. Fresh hydrogen chloride from line 122 is contacted with the ferric oxide leaving hydrolyzer 92 in line 116 to strip any residual chlorine from the ferric oxide. Stripping steam is passed from line 124 into iron oxide stripper 118 where it is contacted with ferric oxide entering the stripper to remove hydrogen chloride. The ferric oxide is then removed from iron oxide stripper 118 by means of line 126 and a minor portion of this stream is removed as a product of the process by line 128. To maintain the temperature in hydrolyzer 92 within the aforementioned range, heat is supplied to it by passing the remaining major portion of the ferric oxide stream to iron oxide heater 130 by means of line 132 where ferric oxide is contacted with hot compressed air entering the iron oxide heater through lines 134 and 132. Fuel oil is used to heat the iron oxide heater 130 and is fed into the heater through line 136. Line 138 is provided for removing combustion gas from the heater. The heated ferric oxide in heater 130 is then removed through line 140 where it is contacted with stripping steam from line 142 in order to free it from inerts such as nitrogen, oxygen and carbon dioxide introduced into heater 130 and into ferric oxide by the air. The steam and ferric oxide are then passed through line 140 to iron oxide stripper 144 wherein ferric oxide is stripped of water by hydrogen chloride which is introduced into stripper 144 by means of line 146. Steam, hydrogen chloride, chlorine and inerts are removed from strippers 118 and 144 by means of lines 148 and 150 from whence they are passed to line 152 and removed from the system. The iron oxide leaving stripper 144 is recycled to hydrolyzer 92 by lines 154 and 98.

The above drawing illustrates only one embodiment of the present invention, however, it is to be understood that many other arrangements are within the scope of this invention. For example, either oxidizer 40 or hydrolyzer 92, or both, can be replaced by a hydrogenator wherein hydrogen gas is introduced and contacted with ferric chloride in place of oxygen or steam, or both and ferric chloride is converted to metallic iron instead of iron oxide. When it is desirable to produce both metallic iron and ferric oxide in the above process, it is preferable to replace oxidizer 40 with the hydrogenator and to add hydrogen through line 46 instead of oxygen thereby causing no substantial alteration in the above-described process. However, if the process is to be self-regenerating, a portion of the hydrogen chloride produced as a by-product of the hydrogen-ferric chloride or the steam-ferric chloride reaction should be reacted with oxygen in order to generate the chlorine gas required in the secondary chlorinator. The temperature and pressure in the hydrogenator are adjusted to meet the aforementioned specifications namely, a temperature between about 400° F. and about 1400° F. and a pressure of from about 20 p.s.i.a. to about 200 p.s.i.a.

It is also to be understood that any of the previously described modifications may be carried out in the present process without substantial alteration of the drawing herein described. For example, the total ferric chloride stream in line 32 can be condensed and transferred to hydrolyzer 92 for conversion to ferric oxide with steam, thereby eliminating oxidizer 40. When this procedure is followed, a portion of the effluent gases from hydrolyzer 92 in line 102 is separated from the major portion of the stream and reacted with oxygen to produce the chlorine gas necessary for feed in chlorinator 12. This chlorine gas is then recycled to chlorinator 12.

The following examples are offered as a better understanding of the present invention and are not to be construed as unnecessarily limiting thereto.

*Example 1*

This example illustrates specific operating conditions for the production of approximately 252,500 pounds/hour of ferric oxide from iron ore. Approximately 297,900 pounds/hour of reduced iron ore is introduced into a primary chlorinator wherein it is contacted with hydrogen chloride entering the primary chlorinating zone at a rate of about 395,000 pounds/hour. The reaction between ferrous oxide in the reduced iron ore and hydrogen chloride to produce ferrous chloride and steam takes place at a temperature of about 850° F. and under 30 p.s.i.a. pressure. About 400,680 pounds/hour of ferrous chloride and 77,166 pounds/hour of gangue are removed in a continuous stream and transferred to a second chlorinator wherein the material is contacted with chlorine gas entering the secondary chlorinator at a rate of about 151,090 pounds/hour. The chlorination reaction between ferrous chloride and chlorine takes place at a temperature of 690° F. under a pressure of about 40 p.s.i.a. and the ferric chloride formed in this zone is vaporized. About 77,166 pounds/hour of the solid materials (gangue and other metal chlorides) are withdrawn from the second chlorinator while 551,770 pounds/hour of vaporous material of which 71.3 mole percent is ferric chloride, 22.1 mole percent is chlorine and 6.6 mole percent is nitrogen is separately removed, partially condensed and separated into a vaporous stream and a liquid stream. Approximately 209,890 pounds/hour of the vaporous stream, which comprises about 45.4 mole percent of ferric chloride, 42.1 mole percent of chlorine and 12.5 mole percent of nitrogen, is transferred to an oxidizer wherein vaporous ferric chloride is contacted with oxygen entering the oxidizer at a rate of about 25,500 pounds/hour. The oxidation reaction between ferric chloride and oxygen to produce ferric oxide and chlorine takes place at a temperature of about 630° F. under about 30 p.s.i.a. Approximately 151,000 pounds/hour of chlorine gas are withdrawn from the oxidizer. A portion of this stream is purged of nitrogen and the remaining portion (approximately 150,800 pounds/hour) is recycled to the second chlorinator.

Ferric oxide (1,164,300 pounds/hour) is separately withdrawn from the oxidizer, of which 84,300 pounds/hour is removed as a product of the process while 1,080,000 pounds/hour are recycled to the oxidizer after being fluidized by the incoming oxygen feed and cooled by indirect heat exchange with water.

The steam from the first chlorinator containing about 28.5 mole percent of hydrogen chloride and about 1.1 mole percent of hydrogen is split into two streams of which 174,394 pounds/hour are recycled to the primary chlorinator to maintain the temperature therein and 174,394 pounds/hour is contacted with the remaining portion of liquid ferric chloride. The mixture of steam and ferric chloride is then transferred to a hydrolyzer where the reaction between the components, at a temperature of about 1000° F. under about 21 p.s.i.a., results in the formation of solid ferric oxide and hydrogen chloride. The solid ferric oxide is removed from the hydrolyzer, stripped with hydrogen chloride and steam and about 168,200 pounds/hour are removed as a product of the process, while about 530,000 pounds/hour are reheated and recycled to the hydrolyzer to maintain the temperature therein.

Hydrogen chloride containing about 20 mole percent of water is separately withdrawn from the hydrolysis zone at a rate of about 354,340 pounds/hour, recompressed to about 30 p.s.i.a., cooled and recycled to the primary chlorinator.

*Example 2*

The Fe$_2$O$_3$ product of Example 1 is transferred to a low temperature reduction furnace wherein the oxide is contacted with hydrogen gas and is thereby reduced to metallic iron at a temperature of about 900° F. under 400 p.s.i.a. A high yield of metallic iron powder is deposited and removed from the furnace and cooled.

It is to be understood that any of the modifications or combinations for processing iron ore previously described herein such as, for example the hydrolysis of the entire ferric chloride stream can be made in Example 1 to produce a useful iron compound.

Having thus described our invention we claim:

1. A process for treating iron ore wherein substantially all of the iron oxide in the ore is in the ferrous state, which comprises: contacting the iron ore with a chlorinating agent consisting essentially of hydrogen chloride in a primary chlorinating zone to produce ferrous chloride, contacting the ferrous chloride with a chlorinating agent consisting essentially of chlorine in a separate, secondary chlorinating zone to produce ferric chloride at a temperature of at least the vaporization temperature of said ferric chloride but below the temperature at which non-ferric metals and other metal chlorides in the ore are vaporized, removing the vaporous ferric chloride from the secondary chlorinating zone, in a first treating zone contacting a portion of the ferric chloride thus removed with a dechlorinating agent of the group consisting of hydrogen, steam and oxygen to produce a product containing iron selected from the group consisting of metallic iron and iron oxide, in a second treating zone contacting a second portion of said removed ferric chloride with a dechlorinating agent of the aforementioned group but different from that employed in the first treating zone to produce the corresponding product containing iron selected from the group consisting of metallic iron and iron oxide, and removing the product containing iron thus produced as a product of the process.

2. A process for treating iron ore wherein substantially all of the iron oxide in the ore is in the ferrous state which comprises: contacting the iron ore with a chlorinating agent consisting essentially of hydrogen chloride in a primary chlorinating zone to produce ferrous chloride, contacting the ferrous chloride with a chlorinating agent consisting essentially of chlorine in a separate, secondary chlorinating zone to produce ferric chloride at a temperature of at least the vaporization temperature of said ferric chloride but below the temperature at which non-ferric metals and other metal chlorides in the ore are vaporized, removing the vaporous ferric chloride from the secondary chlorinating zone, in a first treating zone, contacting a portion of the ferric chloride thus removed with a dechlorinating agent of the group consisting of hydrogen, steam and oxygen to produce a chlorine-containing compound and a product containing iron selected from the group consisting of metallic iron and iron oxide, in a second treating zone contacting a second portion of said removed ferric chloride with a dechlorinating agent of the aforementioned group but different from that employed in the first treating zone to produce a gaseous chlorine-containing compound and the corresponding product containing iron selected from the group consisting of metallic iron and iron oxide, removing the product containing iron as a product of the process and recycling the gaseous chlorine-containing compounds to their respective chlorinating zones.

3. A process for treating iron ore which comprises reducing the iron oxide in an iron ore to the ferrous state, contacting the reduced iron ore with hydrogen chloride as a chlorinating agent in a primary chlorinating zone to produce ferrous chloride, contacting the ferrous chloride with chlorine as a chlorinating agent in a separate, secondary chlorinating zone to produce ferric chloride at a temperature of at least the vaporization temperature of said ferric chloride but below the temperature at which non-ferric metals and other metal chlorides in the ore are vaporized, removing vaporous ferric chloride from the secondary chlorinating zone, treating a portion of the ferric chloride with steam in a hydrolysis zone to produce ferric oxide, removing said ferric oxide as a product of the process, treating the remaining portion of ferric chloride with oxygen in an oxidation zone to produce ferric oxide, and removing the ferric oxide from the oxidation zone as a product of the process.

4. The process of claim 3 wherein the iron ore, in the anhydrous state, contains at least 50 per cent iron and lesser amounts of cobalt, nickel and chromium.

5. The process of claim 3 wherein haematite is an iron ore.

6. The process of claim 3 wherein magnetite is an iron ore.

7. The process of claim 3 wherein goethite is an iron ore.

8. The process of claim 3 wherein martite is an iron ore.

9. A process for treating iron ore which comprises reducing the iron oxide in an iron ore to the ferrous state by contacting the ore with a mixture of hydrogen and carbon monoxide at a temperature of between about 800° F. and about 2300° F., contacting the reduced iron ore with hydrogen chloride as a chlorinating agent in a primary chlorinating zone at a temperature between about 500° F. and about 1400° F. under from 20 to 200 p.s.i.a. to produce ferrous chloride, contacting the ferrous chloride with chlorine as a chlorinating agent in a separate, secondary chlorinating zone at a temperature between about 600° F. and about 1200° F. under from about 10 to about 60 p.s.i.a. to produce vaporous ferric chloride, removing the vaporous ferric chloride from the secondary chlorinating zone, treating a portion of the ferric chloride with steam in a hydrolysis zone at a temperature of between about 600° F. and about 1400° F. under from about 15 to about 200 p.s.i.a. to produce ferric oxide, removing said ferric oxide as a product of the process, treating the remaining portion of ferric chloride with oxygen in an oxidation zone at a temperature between about 400° F. and about 1000° F. under from about 20 to about 200 p.s.i.a. to produce ferric oxide, and removing the ferric oxide from the oxidation zone as a product of the process.

10. A continuous process for treating iron ore which comprises reducing the iron oxide in an iron ore to the ferrous state by contacting the ore with a mixture of hydrogen and carbon monoxide at a temperature of between about 800° F. and about 2300° F., contacting the reduced iron ore with hydrogen chloride as a chlorinating agent in a primary chlorinating zone at a temperature between about 500° F. and about 1400° F. under from 20 to 200 p.s.i.a. to produce ferrous chloride, contacting the ferrous chloride with chlorine as a chlorinating agent in a separate, secondary chlorinating zone at a temperature between about 600° F. and about 1200° F. under from about 10 to about 60 p.s.i.a. to produce vaporous ferric chloride, removing vaporous ferric chloride from the secondary chlorinating zone, treating two-thirds of the ferric chloride stream with steam in a hydrolysis zone at a temperature of between about 600° F. and about 1400° F. under from about 15 to about 200 p.s.i.a. to produce ferric oxide and hydrogen chloride, removing said ferric oxide as a product of the process, recyling said hydrogen chloride to said primary chlorinating zone as part of the feed thereto, treating the remaining portion of ferric chloride with oxygen in an oxidation zone at a temperature of between about 400° F. and about 1000° F. under from about 20 to about 200 p.s.i.a. to produce ferric oxide and chlorine gas, removing the ferric oxide from the oxidation zone as a product of the process and recycling the chlorine gas to the secondary chlorinating zone as a part of the feed thereto.

11. A continuous process for treating iron ore which comprises reducing the iron oxide in an iron ore to the ferrous state by contacting the iron ore with a mixture of hydrogen and carbon monoxide at a temperature of between about 1000° F. and about 2000° F., contacting the reduced iron ore with hydrogen chloride as a chlorinating agent in a primary chlorinating zone at a temperature of between about 700° F. and about 950° F. under from about 30 to about 50 p.s.i.a. to produce ferrous chloride, contacting the ferrous chloride with chlorine gas as a chlorinating agent in a separate, secondary chlorinating zone at a temperature of between about 650° F. and about 750° F. under from about 30 to about 50 p.s.i.a. to produce vaporous ferric chloride, removing vaporous ferric chloride from the secondary chlorinating zone, treating two-thirds of the ferric chloride stream with steam in a hydrolysis zone at a temperature of between about 950° F. and about 1050° F under from about 15 to about 25 p.s.i.a. to produce solid ferric oxide and gaseous hydrogen chloride, removing the solid ferric oxide as a product of the process, recycling the gaseous hydrogen chloride to said primary chlorinating zone as part of the feed thereto, treating the remaining portion of ferric chloride with oxygen in an oxidation zone at a temperature of between about 600° F. and about 700° F. under from about 25 to about 35 p.s.i.a. to produce solid ferric oxide and chlorine gas, removing the ferric oxide from the oxidation zone as a product of the process and recycling the chlorine gas to the secondary chlorinating zone as part of the feed thereto.

12. A continuous process for treating iron ore which comprises reducing the iron oxide in an ore to the ferrous state by contacting the iron oxide with a gaseous mixture of hydrogen and carbon monoxide at a temperature of between about 1000° F. and about 2000° F., contacting the reduced iron ore with hydrogen chloride as a chlorinating agent, in a primary chlorinating zone at a temperature of between about 700° F. and about 950° F. under from about 30 to about 50 p.s.i.a. to produce solid ferrous chloride and steam, continuously and separately removing steam and ferrous chloride from the primary chlorinating zone, contacting the ferrous chloride with chlorine gas as a chlorinating agent in a separate, secondary chlorinating zone at a temperature of between about 650° F. and about 750° F. under from about 30 to about 50 p.s.i.a. to produce vaporous ferric chloride, removing vaporous ferric chloride from the secondary chlorinating zone, treating two-thirds of the ferric chloride stream with said steam in a hydrolysis zone at a temperature of between about 950° F. and about 1050° F. under from about 15 to about 25 p.s.i.a. to produce solid ferric oxide and gaseous hydrogen chloride, removing the solid ferric oxide as a product of the process, recycling the gaseous hydrogen chloride to said primary chlorinating zone as part of the feed thereto, treating the remaining portion of ferric chloride with oxygen in an oxidation zone at a temperature of between about 600° F. and about 700° F. under from about 25 to about 35 p.s.i.a. to produce solid ferric oxide and chlorine gas, removing the ferric oxide from the oxidation zone as a product of the process and recycling the chlorine gas to the secondary chlorinating zone as part of the feed thereto.

13. A process for producing powdered iron from an iron ore which comprises reducing the iron oxide in an iron ore to the ferrous state, contacting the reduced iron ore with hydrogen chloride as a chlorinating agent in a primary chlorinating zone to produce ferrous chloride, contacting the ferrous chloride with chlorine as a chlorinating agent in a separate, secondary chlorinating zone to produce ferric chloride at a temperature of at least the vaporization temperature of said ferric chloride but below the temperature at which non-ferric metals and other metal chlorides in the ore are vaporized, removing vaporous ferric chloride from the secondary chlorinating zone, treating a portion of the ferric chloride with steam in a hydrolysis zone to produce ferric oxide, removing said ferric oxide from said hydrolysis zone, treating the remaining portion of ferric chloride with oxygen in an oxidation zone to produce ferric oxide, removing the ferric oxide from the oxidation zone, combining the ferric oxide and reducing the ferric oxide to metallic iron in a fluid bed reduction reaction with hydrogen at a temperature between about 400° F. and about 1800° F. under from about atmospheric to about 500 p.s.i.a. and removing metallic iron as a product of the process.

14. A continuous process for producing pig iron from iron ore which comprises reducing the iron oxide in an iron ore to the ferrous state by contacting the iron ore with a mixture of hydrogen and carbon monoxide at a temperature of between about 1000° F. and about 2000° F., contacting the reduced iron ore with hydrogen chloride as a chlorinating agent in a primary chlorinating zone at a temperature of between about 700° F. and about 950° F. under from about 30 to about 50 p.s.i.a. to produce solid ferrous chloride and steam, continuously and separately removing steam and ferrous chloride from the primary chlorinating zone, contacting the ferrous chloride with chlorine gas as a chlorinating agent in a separate, secondary chlorinating zone at a temperature of between about 650° F. and about 750° F. under from about 30 to about 50 p.s.i.a. to produce vaporous ferric chloride, removing vaporous ferric chloride from the secondary chlorinating zone, treating two-thirds of the ferric chloride stream with said steam in a hydrolysis zone at a temperature of between about 950° F. and about 1050° F. under from about 15 to about 25 p.s.i.a. to produce solid ferric oxide and gaseous hydrogen chloride, removing the solid ferric oxide as a product of the process, compressing and recycling the gaseous hydrogen chloride to said primary chlorinating zone as part of the feed thereto, treating the remaining portion of ferric chloride with oxygen in an oxidation zone at a temperature of between about 600° F. and about 700° F. under from about 25 to about 35 p.s.i.a. to produce solid ferric oxide and chlorine gas, removing the ferric oxide from the oxidation zone as a product of the process, compressing and recycling the chlorine gas to the secondary chlorinating zone as part of the feed thereto and combining the ferric oxide streams as the product of the process.

References Cited in the file of this patent

UNITED STATES PATENTS

| | | |
|---|---|---|
| 1,833,686 | Meyer | Nov. 24, 1931 |
| 1,917,226 | Bacon | July 11, 1933 |
| 2,291,206 | Bowes | July 28, 1942 |
| 2,771,344 | Michel et al. | Nov. 20, 1956 |
| 2,843,472 | Eberhardt | July 15, 1958 |